US008924468B2

(12) United States Patent
Jensen

(10) Patent No.: US 8,924,468 B2
(45) Date of Patent: Dec. 30, 2014

(54) METHOD AND MEANS FOR A MULTILAYER ACCESS CONTROL

(75) Inventor: Soren Borup Jensen, Struer (DK)

(73) Assignee: Bang & Olufsen A/S, Struer (DK)

( * ) Notice: Subject to any disclaimer, the term of this patent is extended or adjusted under 35 U.S.C. 154(b) by 503 days.

(21) Appl. No.: 12/453,382

(22) Filed: May 8, 2009

(65) Prior Publication Data

US 2009/0282451 A1      Nov. 12, 2009

(30) Foreign Application Priority Data

May 8, 2008   (DK) ................................ 2008 00659

(51) Int. Cl.
| | |
|---|---|
| *G06F 15/16* | (2006.01) |
| *H04N 7/173* | (2011.01) |
| *H04N 21/41* | (2011.01) |
| *G06F 17/30* | (2006.01) |
| *H04N 21/436* | (2011.01) |
| *H04N 21/475* | (2011.01) |
| *H04N 21/4627* | (2011.01) |

(52) U.S. Cl.
CPC ....... *H04N 7/17318* (2013.01); *H04N 21/4126* (2013.01); *G06F 17/30035* (2013.01); *H04N 21/43615* (2013.01); *H04N 21/4751* (2013.01); *H04N 21/4627* (2013.01)
USPC ........... 709/203; 709/225; 709/229; 709/232; 715/741; 715/743; 455/445; 455/456; 725/117; 725/131

(58) Field of Classification Search
USPC .......... 709/203, 225, 229, 232; 715/741, 743; 455/445, 456; 725/117, 131
See application file for complete search history.

(56) References Cited

U.S. PATENT DOCUMENTS

| | | | |
|---|---|---|---|
| 6,981,044 B1 | 12/2005 | Coez et al. | |
| 7,174,021 B2 * | 2/2007 | Krishnaswamy et al. | .... 380/277 |
| 2002/0068573 A1 * | 6/2002 | Raverdy et al. | ............... 455/445 |
| 2002/0112244 A1 * | 8/2002 | Liou et al. | ........................ 725/93 |
| 2003/0217163 A1 * | 11/2003 | Lagerweij et al. | ............ 709/229 |
| 2004/0254934 A1 | 12/2004 | Ho et al. | |
| 2005/0125505 A1 * | 6/2005 | Kim et al. | ..................... 709/219 |
| 2007/0005595 A1 | 1/2007 | Gafter | |
| 2007/0039045 A1 | 2/2007 | McKee et al. | |
| 2007/0204057 A1 * | 8/2007 | Shaver et al. | .................. 709/231 |
| 2008/0133763 A1 * | 6/2008 | Clark et al. | ................... 709/229 |
| 2008/0320543 A1 * | 12/2008 | Wang et al. | .................... 725/131 |
| 2009/0006542 A1 * | 1/2009 | Feldman et al. | .............. 709/203 |
| 2009/0222868 A1 * | 9/2009 | Reynolds et al. | ............. 725/104 |

FOREIGN PATENT DOCUMENTS

| | | |
|---|---|---|
| EP | 1 691 525 | 8/2006 |
| WO | WO 01/50290 | 7/2001 |
| WO | WO 2007/085989 | 8/2007 |

* cited by examiner

*Primary Examiner* — Thuong Nguyen
(74) *Attorney, Agent, or Firm* — Harness, Dickey & Pierce, P.L.C.

(57) ABSTRACT

The invention relates to which source of multimedia information a user can and may access through a number of devices like gateways, servers, media controllers and presentation devices like AV systems, remote commanders, cell phones, media players e.g. an IPod and alike. The access is considered to be multilayer access principle through a chain of media devices from the source, via gateways and destination devices up to a personal handheld portable device in front of the user. The access control method to be used in a multiuser and multi domain environment.

19 Claims, 3 Drawing Sheets

Figure 2
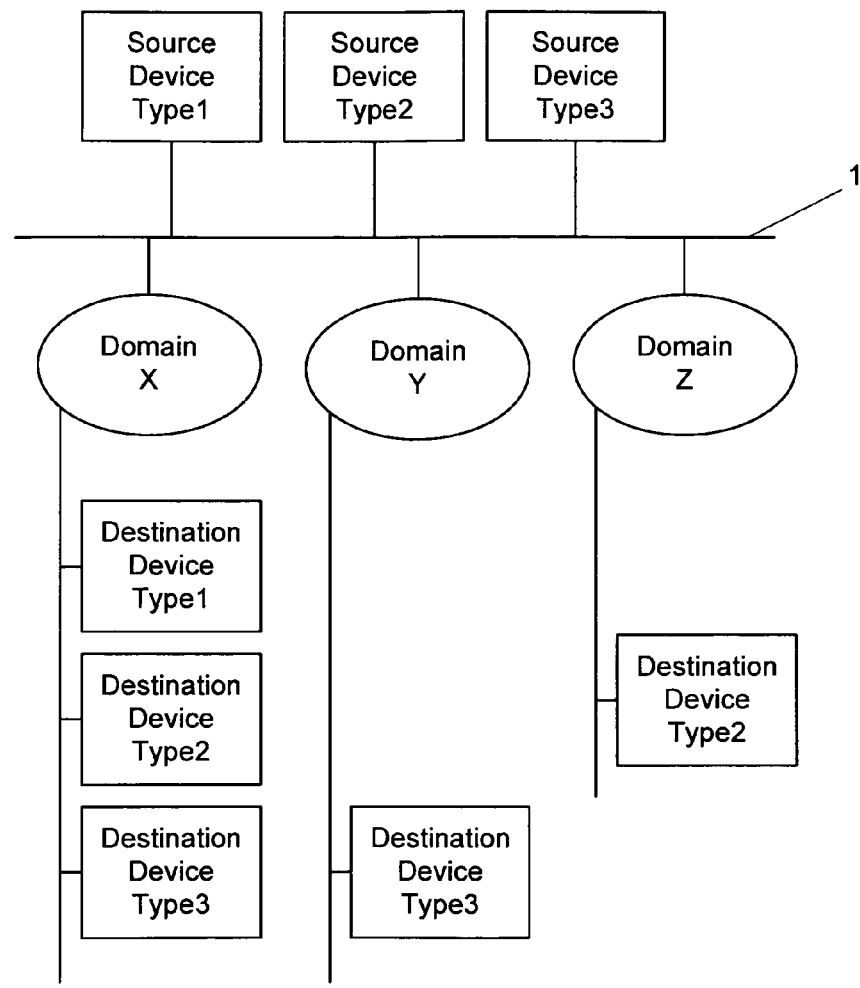
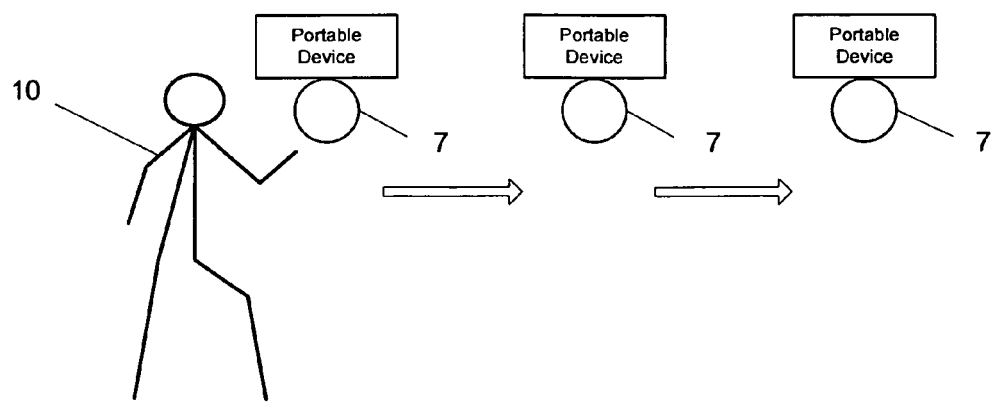

METHOD AND MEANS FOR A MULTILAYER ACCESS CONTROL

BACKGROUND

The present invention relates to access control to acquire and provide multimedia information offered to a user from a number of digital data sources. The access control method may be used in a multiple user and multi domain environment.

More particularly, the invention relates to which source of information an individual user can and may access through a number of devices like gateways, servers, media controllers and presentation devices like AV systems, remote commanders, cell phones, media players e.g. an IPod and alike. The access is considered to be multilayer access principle through a chain of media devices from the source, via gateways and destination devices up to a personal handheld portable device in front of the user.

Today, home appliances like AV systems and media servers do not operate in a real multiuser environment. Typically a server/disk having folders with music, movies, photos and other digital files may be accessed unconditionally by all users, all having the same priority and access rights. Everybody may access and process all information like edit files, read files, write/create files, delete files and execute files.

This is inconvenient and unacceptable seen from a user's point of view. Sources of information should be protected; the father don't want to share information with the son, e.g. "don't 'play that movie", or "don't delete those photos or music files".

SUMMARY

In a first aspect the invention relates to a method of accessing media information from one or more sources of digital information through one or more devices providing the content for the user, the method comprising the steps of:
  providing a number of destination devices all adapted to receive streamed digital information and provide the stream to the user, each destination device having an access profile related thereto describing access rights of individual users to the device,
  providing one or more streams of digital information from the source(s) to the destination devices,
  determining access rights of individual users to the individual streams,
  the user identifying a stream and instructing a destination device to provide the contents of the identified stream,
  if the user, from the access profile of the instructed destination device, is allowed to use the destination device and, from the access rights, to have the identified stream provided, providing the identified stream on the instructed device,
  if the user, from the access profile of the instructed destination device, is not allowed to use the destination device or, from the access rights, to have the identified stream provided, not providing the identified stream on the instructed device.

The primary feature is to offer a plurality of individual users dedicated access to system resources, like data sources and destination devices, according to predefined rights for accessing the resources as defined per user.

The access rights are applied to determine per user whether to allow the user to access and operate the one or more resources considering the right of other users, who are competing to gain access and control to the same resource.

Resources are data source devices and destination devices, where
  one or more source devices may be connected to a local network; and
  one or more source devices may be connected to global networks via gateway devices; and
  one or more destination devices may be connected to the local network.

In the present context, media information may be any type of information to be provided to a person, such as audio, video, images/pictures or the like.

Accessing media information normally means receiving, reading, and/or transmitting the information for a given purpose, such as experiencing or transporting/moving the media information.

In this context, a source of digital information may be any source from which digital information may be obtained or accessed: information carriers/stores/storages/providers on or accessible via the WWW, intranets, LANs, WANs, storages (hard disc, RAM, ROM, PROM, flash, tape, CD-ROM, DVD, or the like), cameras, microphones, antennas, networking equipment, or the like.

A destination device may be any type of device adapted to provide media information to a user, such as a TV, audio/video, multimedia systems, a media player, a stereo, a monitor or the like.

Streamed digital information is information transmitted/transported/received as a stream and not a full file. However, the data being streamed often is stored in a data storage, locally or remotely, as a file. Streaming may be seen as the playing of a file from a remote storage, for example. Streaming may be performed when it is not desired or possible to store the file or information in the destination device which then provides the information without storing and at the rate and point in time of receiving individual parts of the streamed information. Streaming information may be provided in a number of manners, from the more analogue manner of legacy radio to streaming digital information where the event or media file is subdivided into smaller parts which are then individually forwarded to the receiver. Normally, streaming is performed in real time, where the streamed information is not stored at the receiving provider or only stored for a short period of time, such as to ensure and maintain a predetermined or desired timing relationship between individual parts of the streamed information and to cover for drop-outs in the data stream and/or perform error correction.

An access profile may be any type of information describing the user's rights in relation to the device. Such rights may be to turn the device on or off, turn music up/down, change channel/stream. The profile(s) may be stored distributed in the system or at a central location.

Depending on the actual type of transmission of the stream, different manners are applicable in order to allow multiple streams to co-exist. The streams may be transmitted at different carrier frequencies and/or may be transmitted in a manner so that an identity of the stream is derivable from individual parts of the stream, so that a stream may be identified and others discarded if received.

The access rights of individual users to the individual streams may the user's right to delete/stop/start/alter a stream. This alteration/deletion or the like may be performed by a destination device, a source of the media information or any other device.

The identification may be performed by the user activating an element, such as a touch pad, a touch button, a wheel, or the like or enters visual or audio instructions which may be detected and used as an identification. The identification may simply be the information that a presently provided stream is identified, or multiple choices/streams may be provided to the user, one of which is then identified by the user.

The instruction of the destination device may be an instruction separate from the identification or may be the same operation and information, such as if the identification comprises an instruction to the destination device to provide the, then, identified stream. The instruction of the destination device may be as the well-known use of a remote control or operable elements, such as push buttons, on TVs, stereos, monitors or the like.

When the user has identified a stream and provided instructions to the destination device, it is determined whether the user has the rights to use the destination device as desired and to access the desired stream. If so, the stream is provided to the user and, if not, it is not.

Not providing the stream may be to provide nothing. Alternatively, the destination device may maintain a mode of operation, such as the providing of another stream.

In one embodiment, the identifying step comprises also identifying the user. Usually, this is required for determining the rights of the user. Alternatively, the user may be indirectly identified by e.g. a personal detectable token of the user, or the instruction of the destination device (or the destination device itself) may be specific to the user.

In a preferred embodiment, the identifying/instructing step comprises the user operating a portable device to provide information personalized according to the data/stream acquired from the addressed source(s), the addressed destination(s), the actual user, and the access rights. Then, the portable device may be personal to the user, or the user may be identified by the portable device, so that information output of the portable device comprises identification information identifying the user (or portable device). In this context, a portable device may be any type of portable device able to output information (wireless or not), such as remote controls, laptops, palmtops, MP3/4-players, cell phones, media players, navigators or the like.

In one embodiment, one or more of the streams are each derived from a source of files, the access of which is controlled by an access profile related to the one or more actual files on one or more source devices. In general, each step or device may have its own access profile, so that the access and providing of a media stream on a destination device is governed by a sum (i.e. a logical AND) of the individual access profiles, so that the stream is provided only on devices (destination device and any intermediate devices) to which the user has suitable rights.

In one embodiment, the identifying/instructing step comprises identifying the instructed destination device from a domain in which the user is present. Thus, the whereabouts of the user may be tracked or determined, whereby the destination device instructed may be determined on the basis of (solely or in addition to) a domain in which the user is positioned as well as any additional information relating to destination device(s) present in that domain which may be able to provide the stream desired. The last situation relates to the situation were, in a domain, a stereo and a TV are present, whereby the TV is the only device adapted to provide video, but both devices are adapted to output sound.

A specific portable device may provide information personalized according to the data acquired from the addressed source(s), the addressed destination(s), the actual user and the related chain of access profiles as e.g. determined from the access profiles of all individual elements.

In one embodiment, the one or more source devices are connected to a local network to which one or more of the destination devices are connected. Then, the streams may be provided or transmitted also over this network. This network, naturally, may be wireless and/or via wires.

In addition, one or more source devices preferably are connected to global networks via gateway devices, such as routers, switches, modulators, transceivers or the like adapted to e.g. communicate with the WWW, WANs or the like. In this manner, information from outside the present system may be obtained.

In one embodiment, the identification/instructing step comprises one or more of the destination devices present in a room/domain identifying the user (such as when using of one or more portable devices) in the room/domain. In this respect, a domain may be a house, a part of a house or building, a room, a car, a garden or part thereof or the like. The presence in a domain may be determined in a number of manners, such as by a signal strength of an element (RFID tag, handheld device, portable element or the like) carried by the user. This signal strength will depend on the distance to the user as well as whether any obstructions, such as walls, are present. The presence of a wall (and thus lower signal strength) may be taken as a sign that the user is not in this domain.

If the user exits or leaves a domain, the destination device(s) may keep receiving and providing the data, such as until instructed by another user entering the domain and having the rights to do so, or may simply stop providing the information when the user leaves the domain.

If a user leaves a domain while receiving a stream and enters another domain, he may instruct, if he has the rights to do so, a destination device in the other domain to provide the same stream. In this situation, the streaming in the two domains may be correlated or synchronized so as to provide the information with a timing relationship within predetermined limits, such as within 100 ms, preferably within 10 ms, such as within 5 ms, preferably within 1 ms, such as within 200 μs, so that, if the information is music, no large delay is heard between the sound from the two domains. This correlation may be obtained by transmitting timing pulses intermittently, such as between audio tracks or the like.

The presence in a room/domain of one or more users may be identified, and the identification may then be used in the access to the one or more source devices and to the one or more destination devices.

In one situation, a user is related to a predetermined portable device outputting a unique identifier, the identifying step comprising identifying the user by the unique identifier. This unique identifier may be output intermittently or when outputting other information or instructions, such as when instructing a destination device or when identifying a stream.

In general, the step of determining access rights could comprise determining, for one or more of the users, additional rights to the streams. Thus, not only the access to the stream but also any altering thereof or a source thereof (such as the deletion of the file streamed) may be determined. Such functions could in general be read, write, execute, delete, edit of the data or the like.

In one embodiment:
  a first user instructs a first of the destination devices to provide the contents of an identified stream,
  a second user instructs a second of the destination devices to read, start, stop, edit and/or delete the identified stream, the second destination device reading, starting, stopping, editing and/or deleting the identified stream, if the second user has access rights to the identified stream.

A second aspect of the invention relates to a system for accessing media information, the system comprising one or more sources of digital information and one or more devices for providing the content for the user, wherein:

the destination devices are adapted to receive streamed digital information and provide the stream to the user, each destination device having an access profile related thereto describing access rights of individual users to the device, means for providing one or more streams of digital information from the source(s) to the destination devices, means for determining access rights of individual users to the individual streams, means for the user to identify a stream and instruct a destination device to provide the contents of the identified stream, means for determining whether the user, from the access profile of the instructed destination device, is allowed to use the destination device and, from the access rights, to have the identified stream provided, and:

a. if so, instruct the instructed device to provide the identified stream on the instructed device, b. if not, not instructing the instructed device to provide the identified stream on the instructed device.

Thus, a system may be provided for carrying out the method of the first aspect.

In the present context, the means for providing the one or more streams of digital information from the source(s) to the destination devices may be networking equipment, such as switches, routers, modems, antennas, transceivers and the like.

The means for determining access rights of individual users to the individual streams may be a single processing or determining element to which the individual sources/destination devices and any portable elements may have access. Alternatively, a plurality of such means may be distributed in the system.

The means for the user to identify a stream and instruct a destination device to provide the contents of the identified stream may be any type of user operable element, such as elements present in or on destination devices or portable, such as remote controls, cell phones, laptops, palmtops or the like.

Also, the means for determining whether the user is or is not allowed to have a stream provided may be a single means or distributed means. A centralized means may, e.g. control the streaming from source(s) to the destination devices as well as hold the individual access profiles and then determine the overall rights of a user vis-á-vis a destination device and a stream.

Streams of information may be derived or obtained from e.g. digital broadcast, digital TV channels, digital audio channels, pod cast, world-wide-web file archives, music file providers and/or video file providers, local as well as remote.

In one embodiment, the identifying means further comprise means for identifying the user.

In that or another embodiment, the identifying/instructing means comprise a portable device adapted to provide information personalized according to the data/stream acquired from the addressed/identified source(s), the addressed/instructed destination(s), the actual user, and the related access rights.

In one embodiment, the means for providing the stream(s) are adapted to derive one or more of the streams from a source of files, the access of which is controlled by an access profile related to the one or more actual files on one or more source devices. As mentioned above, the source of files may be a remote file storage, such as via the WWW or LANs/WANs, or may be directly available over a local or private network or to one or more elements, such as destination devices, of the system. Naturally, information may be derived or derivable from a number of different sources.

In one embodiment, the identifying/instructing means comprise means for identifying the instructed destination device from a domain in which the user is present. Thus, the system, such as the destination device in the domain, may comprise presence sensing means, such as means for receiving a signal from the user or an element carried by the user.

In one embodiment, a specific portable device may provide information personalized according to the data acquired from the addressed source(s), the addressed destination(s), the actual user and the related chain of access profiles.

In one embodiment, the one or more source devices are connected to a local network to which the destination devices are connected. This may be via networking equipment, such as switches, routers, transceivers or the like.

Also, one or more of the source devices may be connected to global network(s) via gateway devices.

In one embodiment, the identification/instructing means form part of one or more of the destination devices present in a room/domain and are adapted to identify the user (such as when using of one or more portable devices) in the room/domain.

In one embodiment, the presence in a room/domain of one or more users is identified, and the identification is used in the access to the one or more source devices and to the one or more destination devices.

In one situation, the system further comprises a predetermined portable device outputting a unique identifier identifying a person, the identifying means being adapted to identify the user by the unique identifier.

In one embodiment, the determining means are adapted to determine, for one or more of the users, additional rights to the streams. Thus, when receiving instructions from the user to e.g. read, write, execute, delete, edit a stream or data thereof, an analysis of whether this is allowable may be performed.

In one embodiment, the determining means are adapted to, when:

the providing means provide a first stream, on behalf of a first user, to a first of the destination devices, the identifying means identify a second user, the first stream, and a second of the destination devices to read, start, stop, edit and/or delete the identified stream, the second destination device reading, starting, stopping, editing and/or deleting the identified stream, if the second user has access rights to the identified stream.

In one embodiment, the access profiles additionally hold user defined preferences related to system behaviour relevant in a specific domain.

In one embodiment, access profiles are grouped into one or more groups of resources, in order to simplify the access control method and make it more efficient in certain cases, thus the grouping, where one or more destination devices may be grouped into one or more individual domains, with each domain to constitute a logical entity; and one or more portable devices may be located and identified with a unique identification code and operated individually in each of the one or more individual domains.

BRIEF DESCRIPTION OF DRAWINGS

In the following, a preferred embodiment will be described in relation to the drawings, wherein:

FIG. 2 illustrates the logical grouping into domains and how a user moves across domains.

DETAILED DESCRIPTION OF EXAMPLE EMBODIMENTS

The overall technology relates to how a multiple number of users may interact with a number sources of multimedia information, to gain access to, and control of, those sources of information.

The available information to access and control is individual according to predefined access rights per user, and optionally according to a number of preferences defined per user by the user him/herself.

The user may gain access to the source of information and must possess the necessary rights to provide the accessed information onto a destination device, e.g. playing a specific music file (source) on a dedicated set of speakers (destination).

The sources of information may be controlled by the user via wireless and portable remote control devices. An individual user is logically related to one dedicated remote controller; this implies that the remote controller becomes a device that reflects and provides to the specific user, only relevant information according to the user and the user interaction with the subset of the complete system devices, that's under control by the user.

Thus the system enables sources of multimedia information to be accessed and provided to specifically one individual user with the relevant subset of information presented on the destination devices relevant for that user and presented on the remote portable device relevant for that user, and where access to devices are governed by individual user access profiles.

Figure 1:
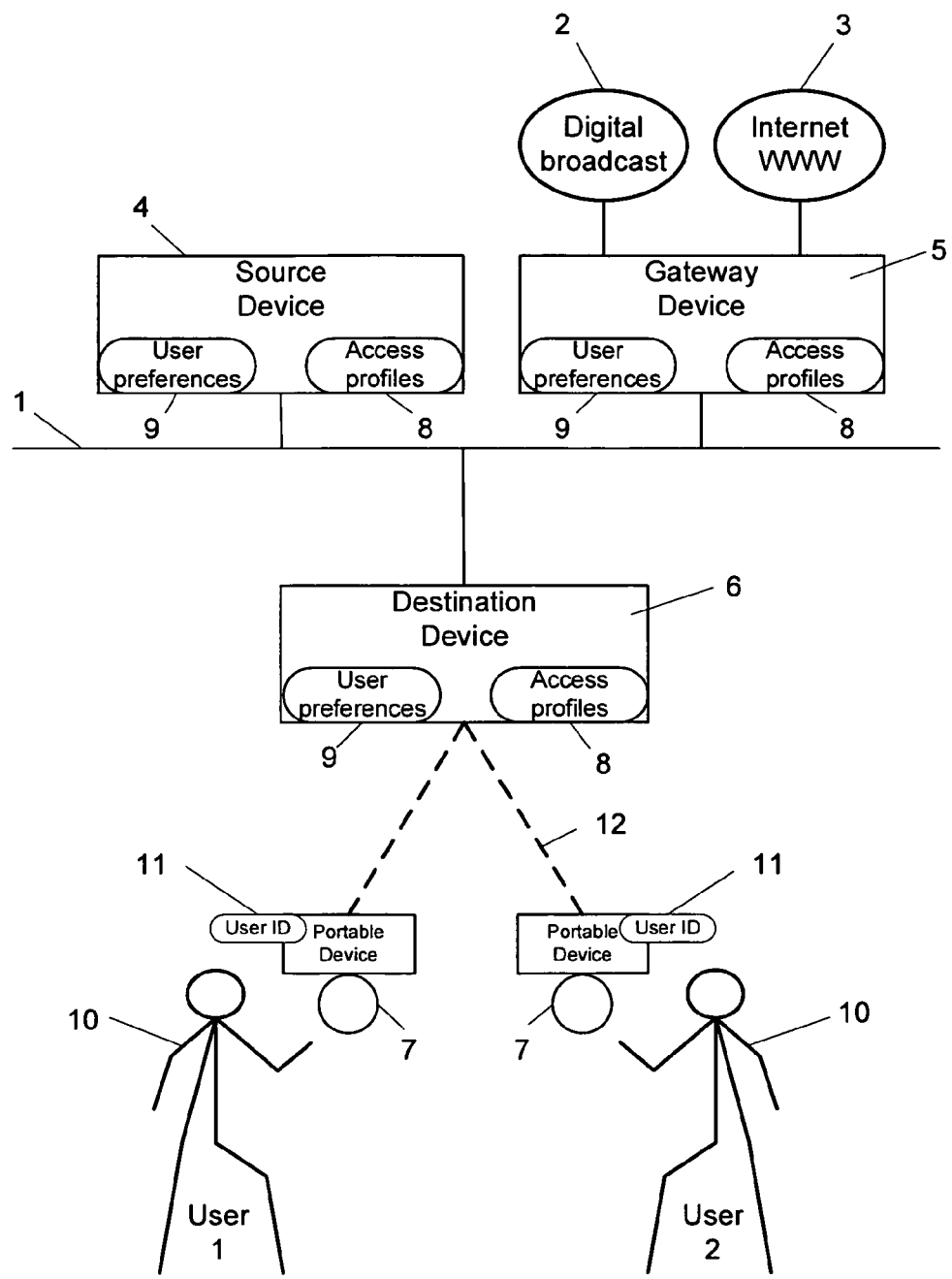
FIG. 1 illustrates the multilayered access control principle.

In FIG. 1, an embodiment illustrates how one or more sources (4) of information are connected to local a network (1).

Examples of sources of information are, but not limited to: disk devices like hard drives HDD, digital RAM disk, SSR, SDA cards, DVD devices and file servers like PC's and Laptops.

Access to this type of sources that contains data/files is as a minimum determined by the access rights/profiles (8), per user, to:
  Read data/file
  Write/create data/file
  Edit data/file
  Execute data/file
  Delete data/file Thus it becomes an access right (8) to an individual file and/or to a folder containing a set of files, having at least the same set of access rights.

Optionally a set user preferences may be allocated per device or per file/folder as required by the user. The preferences to determine the system behaviour related to a user access to the device or file/folder.

Examples on preferences (9), per user, are, but are not limited to:
  Update automatically and periodically a file/folder with data from a provider on the internet (3).

FIG. 1 in addition illustrates how external sources of information may be accessed seamlessly as local source devices.

Digital, broadcasted information (2) like DAB radio, Podcasts and video broadcast becomes sources of accessible information via dedicated receivers by standard means of specific gateway devices (5): like PC's, TV channel receivers and DAB channel receivers and alike.

Internet based sources of information (3) like service providers of music files and video files may be accessed seamlessly as local source devices.

The data/files are accessed by standard means of specific gateway devices (5): like PC's and digital data server routers and repeaters.

These gateway devices (5) may all have embedded access rights means as described above.

FIG. 1 also illustrates how sources of information may be provided onto a local destination device (6). Destination devices are equipment having means to provide digital information to a person, such as in the form of sound, video/picture, text, graphics and movies.

Examples of destination devices are, but not limited to: screens, TV sets, Audio-Video systems, loudspeakers, PC's and Laptops i.e. multimedia players in a broad sense, such as portable MP3/4 players.

Access to this type of destination devices for providing the data/files are as a minimum determined by the access rights/profiles (8), per user, to:
  Control and navigate the device (e.g. On/Off and functional operation),
  Level of control mode (all, high, medium, low, none).

Thus it becomes an access right (8) to be able to start/stop and operate the device, for one user competing with another user having identical or different access rights.

Optionally, a set of user preferences may be allocated per device as required by the user. The preferences to determine the system behaviour are related to a user's access to the device.

Examples on preferences (9) are, but limited to:
  Replicate automatically to remote controller when applicable.
  Other definitions according to preferences related to one room.

In the preferred embodiment, a portable device (7) is related to one specific user (10) and acts as the user's window to the world of opportunities that's offered through the destination device (6) and the sources of information that's acquired from the one or more available sources of information (4) accessible from the local network (1) and the sources of information that's acquired from the one or more available sources of information (5) accessible from the external global network (2,3).

The location of the portable device, i.e. in which room it's located is detected automatically via standard wireless means on a Destination Device that's located in a room.

The user may be related to one specific portable device by alternative means:
  The user enters a specific code in terms of a user identification code, this being an integer number, or an alphanumeric number.
  The user activates a specific button, e.g. one out of four dedicated buttons, in terms of a user identification code, e.g. to identify one out of four users.
  The portable device has standard means to detect the user identification via fingerprint sensing, and maps that into a user identification code (ID).
  The portable device has standard means to detect the user identification via iris eye sensing, and maps that into a user identification code (ID).
  The portable device has standard means to detect the user identification via graphical image detection, e.g. the contour of the face, and maps that into a user identification code (ID).

When the user has been identified by the portable device, all commands from/to this device via a wireless data/control channel (12) to/from the destination devices are marked with the relevant user identification code.

The ID is used in each of the devices, i.e. source, gateway and destination devices to select the appropriate access profile to be used in the complete chain of processing events that's related to a user request of access.

The portable device may provide fully or partly digital data as received from sources and according to the request given by the user.

Examples of portable devices are, but not limited to: remote terminals, AV commanders, PDA's, IPods, cell phones, multimedia players and alike.

Portable devices may communicate to/from (12) destination devices via standard means like infrared, ultra sound signals, Bluetooth or Wireless LAN.

One or more Portable Devices may be present in a room; each of the devices is updated individually and according to the actual user applying the device in question.

In FIG. 2, an embodiment illustrates how the type of one or more Destination Devices determines which digital data source information that may be provided fully in a room and provided fully or partly on a Portable Device located in a room.

One or more Destination Devices located in a room constitutes a logical domain. Optionally, access profiles may be applied at the domain level as an alternative to the individual access profiles allocated to each of the devices in the domain.

Different types of Destination Devices are identified according to the providing capabilities of source files that they possess:
  Type 1: provide audio and video, picture, graphics and text e.g. an AV multimedia system.
  Type 2: provide audio and video, e.g. a TV set.
  Type 3: provide audio only, e.g. a speaker system.

In the example, a user (10) enters the Domain X and grabs the portable device (7) that's located in the room. Available sources of digital information in this domain/room are devices that are logically accessible from the domain and may be a plurality of sources of physical devices connected to the local network (1) and/or virtual devices connected via gateways to the local network (1).

The information provided onto a Portable device is according to:
  1. The user's right to operate as defined in the access profiles.
  2. The source of information according to the access profile of the user.
  3. The capabilities of the one or more destination devices in the room in which the user is present and the user's right to access the device.
  4. The capability of the portable device itself, i.e. the ability to execute source information and provide it as sound, pictures, movies and other.

In the example, the same user moves from domain to domain which implies that the functional and operational capabilities that's provided on the Portable Device, to the user, changes accordingly:
  1. In Domain X in which a full set of Destination Devices are present the user has the full set of functions accordingly.
  2. In Domain Y in which a limited set of Destination Devices are present the user has the limited set of functions accordingly.
  3. In Domain Z in which another limited set of Destination Devices are present the user has another limited set of functions accordingly.

Another user with a different access profile, but in the same scenario as above, may be offered different functions available at the Portable Device, caused by a difference in the access rights.

Figure 3:
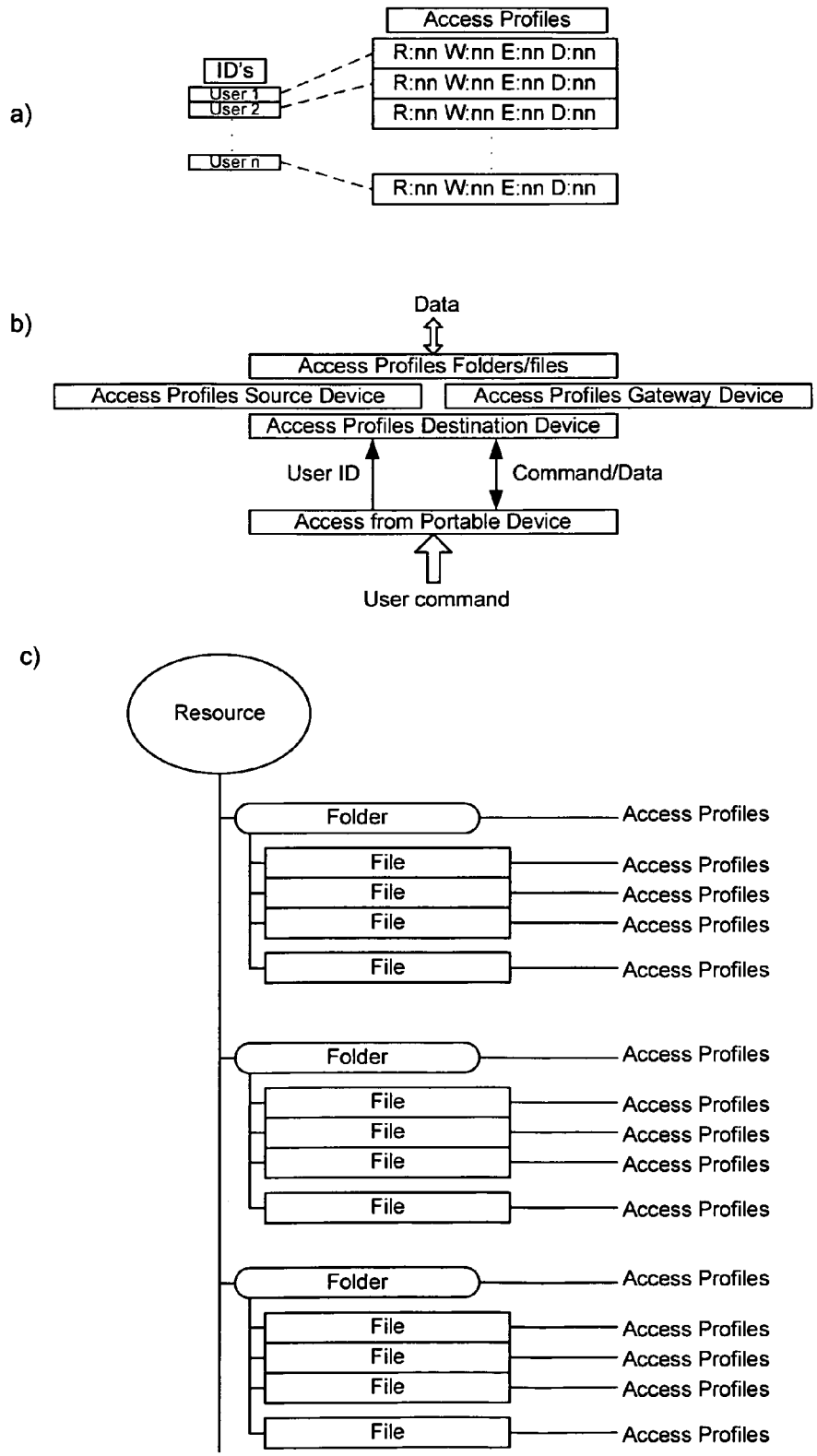
FIG. 3 illustrates application examples of the access profiles.

In FIG. 3, the preferred embodiment displays how access profiles may be organized.

FIG. 3.a displays how simple table structures contains the user represented by an ID code, this code is obtained by/via the Portable Device. The ID code is used as an index to the table containing predefined user access profiles, with one entry per user.

An integer value 0→9, with 9 as the highest priority level, may represent the 'access rights' level allocated per user and per access right to obtain e.g.: R: (read), W: (write/edit/create), E: (execute), D: (delete).

FIG. 3.c displays how resources, i.e. a Folder and File structure on a Source Device, are allocated with the ID of the creator/user as entry to the corresponding access profile of that user.

Only users having access rights greater than (>) or equal to (=) the resource access profile parameters may operate according to the given access rights.

An example is:
  If a user has created a music file with the access rights 'E (execute): 1' and 'D (delete): 3' then
  A user with access rights 'E:1' and 'D:1' may play (execute) the music file but cant delete the music file.

FIG. 3.b displays how the preferred embodiment of the invention is a layered access right principle:
  The user is identified, and issues commands and control via the Portable Device.
  The User ID becomes the key to the access to the destination device, i.e. determines if the user may operate this device, and is the device already occupied by another user with a higher priority?
  Resources, i.e. folders/files on the Sources Devices may be accessed and provided according to the related access profiles governed by the access rights of the actual user.
  The data are provided to the Portable Device of the requesting user when the access right is fully obtained according to the layered path of rights.

During an initial system configuration users are defined with their related access right profiles.

A default access profile is allocated to the resources upon creation. The default profile allocated is identical to the access profile of the creator (a user becomes the owner), and defines the rights accordingly. The owner may change the profile as required.

Thus as part of the access profiles related to resources and source files the user identification code (ID) of the owner of the resources and files is included.

In the case where two users, having the same level of access rights, are competing for a resource the owner of the resource gains priority to accessing the resource.

In a preferred embodiment examples on the mode of operation are:
  User 1 Scenario—Initially the System is Off:
  User 1 enters a room bringing with him/her a portable device that has identified the actual user.
  All the destination devices in the room are in an off state, and the portable device is updated with a status display reflecting the status of the one or more destination devices in the room, and with the content on the display reflecting what is accepted according the user access profile related to the one or more destination devices.

The user commands via the portable device to play a DAB radio channel, and consequently the access profiles are in action to access the digital broadcast source of information.

The data information is provided to the destination device as sound and additional information about e.g. details of the actual channel (cover with title and artist), and/or alternative channels that may be provided.

The data information is partly provided to the portable device with additional information about e.g. details of the actual channel (cover with title and artist), and/or alternative channels that may be provided.

In this mode the portable device acts as a two way interactive system controller.

User 1 Scenario—Initially the System is Active:

User 1 has a folder containing a selection of music files stored on the Source Device (4); the files have been downloaded from a provider, e.g. a music store, on the Internet (3).

The files are marked with the access right (8) of the User 1 that has created the folder with the file content.

Every user with a level of access rights equal to or higher than User 1 may access the folder/files accordingly.

User 1 enters a room and grabs the portable device, and by this is identified to be in this specific room.

The display on the portable device is partly or fully updated according to the User 1 access rights and available sources that are physically present in the room and sources that are logically present in the room, i.e. network based sources that fulfil the access rights of a specific user.

User 1 selects, via the portable device screen, a music file to be provided on the Destination Device in the room.

The Destination Device provides the sound via speakers in the room, and optionally displays additional information, like title/cover data on the local screen on the Destination Device and provides the same information to the Portable Device for the display on this.

Any command that the user may want to initiate has the impact that the Destination Device takes action and the Portable Device is updated accordingly.

User 2 Scenario in the Same Room as User 1:

User 2 enters the room and grabs the portable device, and by this is identified to be in this specific room.

The display on the portable device is partly or fully updated according to the User 2 access rights and available sources that are physically present in the room and sources that are logically present in the room, i.e. network based sources that fulfil the access rights of a specific user.

User 2 selects, via the portable device screen, a video file to be provided on the Destination Device in the room.

As the Destination Device is occupied by User 1, that provides music on the device, the Destination Device replicates automatically the sound and video to the Portable Device in the hand of User 2.

Any command that the user may want to initiate has the impact that the Destination Device takes action and the Portable Device is updated accordingly.

User 2 Scenario in the Same Room as User 1:

User 2 enters the room and grabs the portable device, and by this is identified to be in this specific room.

The display on the portable device is partly or fully updated according to the User 2 access rights and available sources that are physically present in the room and sources that are logically present in the room, i.e. network based sources that fulfil the access rights of a specific user.

User 2 selects, via the portable device screen, to be connected to the active playing of music that User 1 has initiated.

As the Destination Device is already active on behalf of User 1, and provides music on the device, the Destination Device replicates automatically the status information to the Portable Device in the hand of User 2.

Any command that the users may want to initiate has the impact that the Destination Device takes action and the Portable Devices is updated accordingly.

The invention is very useful in home appliances where a plurality of users playing in parallel and at the same time share the full set of system features and resources in a secure way, and where rights to source material, and sharing of destination devices are respected in an acceptable manner.

Examples of the application areas of the invention are, but not limited to: Audio/Video systems, TV's, PC's, Laptops, DVD's, HDD's, SDA's, SSR's, Media players and Servers. The mentioned system devices to handle a plurality of different type of source material, the type of which may be, but not limited to: digital broad cast data, digital TV channels, digital audio channels, pod cast, world-wide-web file archives, and music file providers and video file providers.

The invention claimed is:

1. A method of accessing media information from a plurality of sources of digital information using a plurality of destination devices, the plurality of destination devices providing the contents of the media information to two or more users, the method comprising:

providing the plurality of destination devices, each destination device being configured to receive a plurality of streams of digital information that are not downloaded to the destination device and provide one or more streams of digital information to the two or more users, each destination device having an access profile related thereto describing access rights of the two or more users to the destination device, providing the one or more streams of digital information from the plurality of sources to the plurality of destination devices, determining access rights of a first user of the two or more users to the one or more streams of digital information, the access rights of the first user comprising a priority level associated with the first user, the priority level indicating a priority of the first user to access the one or more streams, identifying one of the one or more streams of digital information, instructing a first destination device of the plurality of destination devices to provide the contents of the identified one of the one or more streams of digital information to the first user, providing, by the first destination device, the contents of the identified one of the one or more streams of digital information to the first user when the first user is allowed to use the first destination device based on the access profile of the first destination device, and when the first user is allowed to receive the contents of the identified one of the one or more streams of digital information based on the access rights, and not providing, by the first destination device, the contents of the identified one of the one or more streams of digital information to the first user when the first user is not allowed to use the first destination device based on the access profile of the first destination device or is not allowed to receive the contents of the identified one of the one or more stream of digital information based on the access rights, receiving, by at least one of a plurality of devices associated with a second user, status information about the contents of the identified one of the one or more streams of digital information with respect to the first user, instructing, based on the status information, a second destination device of the plurality of destination devices to at least one of start, stop, edit, and delete the contents of the identified one of the one or more streams of digital information, the second destination device being in the plurality of devices associated with the second user, and performing, by the second destination device, at least one of starting, stopping, editing, and deleting the contents of the identified one of the one or more streams of digital information with respect to the first user when the second user has access rights to the contents of the identified one of the one or more streams of digital information, and when a priority level associated with the second user to access the contents of the identified one of the one or more streams of digital information is higher than the priority level of the first user to access the contents of the identified one of the one or more streams.

2. The method according to claim 1, wherein the identifying identifies the first user.

3. The method according to claim 1, wherein the identifying includes operating a portable device to provide information personalized according to the one or more streams of digital information acquired from at least one source, the first destination device, the first user, and the access rights.

4. The method according to claim 1, wherein the one or more streams of digital information is derived from a source of files, the access of which is controlled by a file access profile related to the files on the source devices.

5. The method according to claim 1, wherein the identifying identifies the first destination device from a domain in which the first user is present.

6. The method according to claim 1, wherein the source devices are connected to a local network to which the plurality of destination devices are connected.

7. The method according to claim 1, wherein the identifying includes identifying the first user present in a domain by at least one destination device present in the domain.

8. The method according to claim 7, wherein the first user is related to a given portable device outputting a unique identifier, and the identifying includes identifying the first user by the unique identifier.

9. The method according to claim 8, wherein the determining access rights determines additional rights of the first user to the one or more streams of digital information.

10. A system for accessing media information, the system including a plurality of sources of digital information and a plurality of destination devices for providing contents of the digital information to two or more users, the destination devices being configured to receive a plurality of streams of digital information and provide one or more streams of digital information to the two or more users, each destination device having an access profile related thereto describing access rights of the two or more users to the destination device, the system comprising:

means for providing the one or more streams of digital information from the plurality of sources to the plurality of destination devices, the one or more streams of digital information not being downloaded to the plurality of destination devices, means for determining access rights of a first user of the two or more users to the one or more streams of digital information, the access rights of the first user comprising a priority level associated with the first user, the priority level indicating a priority of the first user to access the one or more streams, means for the first user to identify one of the one or more streams of digital information and to instruct a first destination device to provide contents of the identified one of the one or more streams of digital information to the first user, means for determining whether the first user, from the access profile of the first destination device, is allowed to use the first destination device, and whether the first user, from the access rights, is allowed to receive the identified one of the one or more streams of digital information, means for instructing the first destination device to provide the contents of the identified one of the one or more streams of digital information when the first user has rights to receive the contents of the identified one of the one or more streams of digital information, and means for instructing the first destination device not to provide the content of the identified one of the one or more streams of digital information to the first user when the first user does not have rights to receive the content of the identified one of the one or more streams of digital information, means for receiving, by at least one of a plurality of devices associated with a second user, status information about the content of the identified one of the one or more streams of digital information with respect to the first user, means for instructing, based on the status information, a second destination device of the plurality of destination devices to at least one of start, stop, edit, and delete the content of the identified one of the one or more streams of digital information, the second destination device being in the plurality of devices associated with the second user and means for performing, by the second destination device, at least one of starting, stopping, editing, and deleting the contents of the identified one of the one or more streams of digital information with respect to the first user when the second user has access rights to the contents of the identified one of the one or more streams of digital information, and when a priority level associated with the second user to access the contents of the identified one of the one or more streams of digital information is higher than the priority level of the first user to access the contents of the identified one of the one or more streams of digital information.

11. The system according to claim 10, wherein the identifying means identifies the first user.

12. The system according to claim 10, wherein the identifying means includes a portable device configured to provide information personalized according to the one or more identified streams of digital information acquired from one of the sources, the first destination device, the first user, and the related access rights.

13. The system according to claim 10, wherein the means for providing the one or more identified streams of digital information is configured to derive the one or more streams of digital information from one of the plurality of sources, the access to which is controlled by a file access profile related to at least one file on one of the plurality of sources.

14. The system according to claim 10, wherein the identifying means identifies the first destination device from a domain in which the first user is present.

15. The system according to claim 10, wherein the plurality of sources are connected to a local network to which the plurality of destination devices are connected.

16. The system according to claim 15, wherein the identifying means is at least a portion of at least one destination device present in a domain and is configured to identify users in the domain.

17. The system according to claim 16, further comprising a portable device configured to output a unique identifier, and the identifying means is configured to identify the first user by the unique identifier.

18. The system according to claim 17, wherein the determining means is configured to determine additional rights of the first user to the one or more streams of digital information.

19. A system for accessing media information, the system including a plurality of sources of digital information and a plurality of destination devices for providing contents of the digital information to two or more users, the destination devices being configured to receive a plurality of streams of digital information and provide one or more streams of digital information to the two or more users, each destination device having an access profile related thereto describing access rights of the two or more users to the destination device, the system comprising:
  a device configured to provide the one or more streams of digital information from the plurality of sources to the plurality of destination devices, the one or more streams of digital information not being downloaded to the plurality of destination devices, a first destination device of the plurality destination devices being configured to determine access rights of a first user of the two or more users to the one or more streams of digital information, the access rights of the first user comprising a priority level associated with the first user, the priority level indicating a priority of the first user to access the one or more streams;
  a first user device, associated with the first user, configured to identify one of the one or more streams of digital information and to instruct the first destination device to provide contents of the identified one of the one or more streams of digital information to the first user, wherein
  the first destination device is configured to determine whether the first user, from the access profile of the first destination device, is allowed to use the first destination device, and whether the first user, from the access rights, is allowed to receive the identified one of the one or more streams of digital information, and
  the first destination device is configured to provide the contents of the identified one of the one or more streams of digital information when the first user has rights to receive the contents of the identified one of the one or more streams of digital information, and not to provide the contents of the identified one of the one or more streams of digital information to the first user when the first user does not have rights to receive the contents of the identified one of the one or more streams of digital information; and
  at least one of a plurality of devices associated with a second user device associated with a second user of the two or more users, configured to receive status information about the contents of the identified one of the one or more streams of digital information with respect to the first user, and instruct, based on the status information, a second destination device of the plurality of destination devices to at least one of start, stop, edit, and delete the contents of the identified one of the one or more streams of digital information, the second destination device being in the plurality of devices associated with the second user, wherein
  the second destination device is configured to perform at least one of starting, stopping, editing, and deleting the contents of the identified one of the one or more streams of digital information with respect to the first user when the second user has access rights to the contents of the identified one of the one or more streams of digital information, and when a priority level associated with the second user to access the contents of the identified one of the one or more streams of digital information is higher than the priority level of the first user to access the contents of the identified one of the one or more streams of digital information.

* * * * *